July 5, 1966  E. A. FINCH  3,259,401
DATA TABULATING DEVICE
Filed Jan. 23, 1964  5 Sheets-Sheet 3
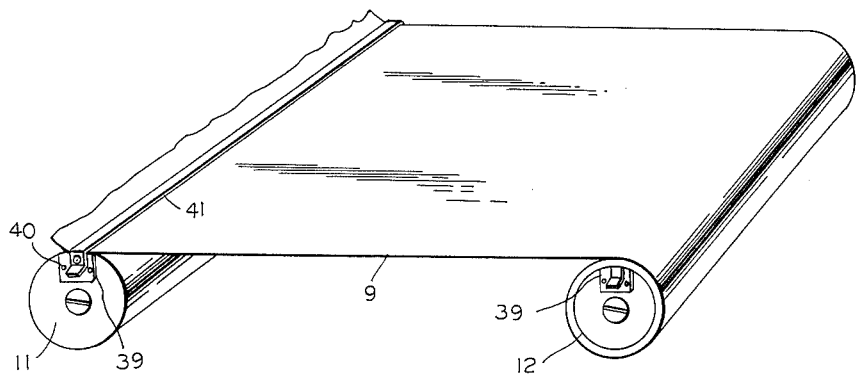
FIG.5
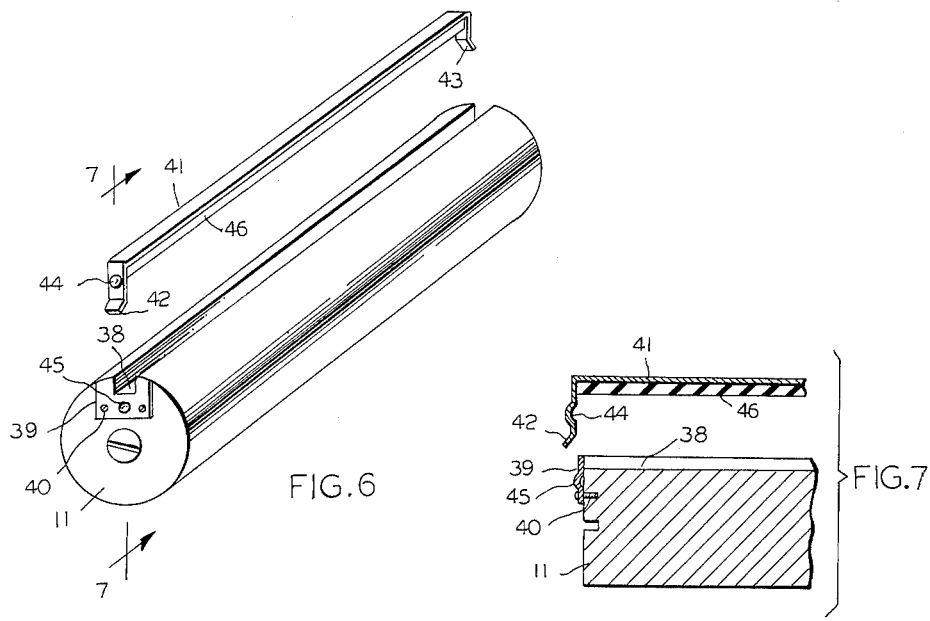
FIG.6
FIG.7
INVENTOR
EARL A. FINCH
BY
R. Hoffman
ATTORNEY July 5, 1966   E. A. FINCH   3,259,401
DATA TABULATING DEVICE
Filed Jan. 23, 1964   5 Sheets-Sheet 4

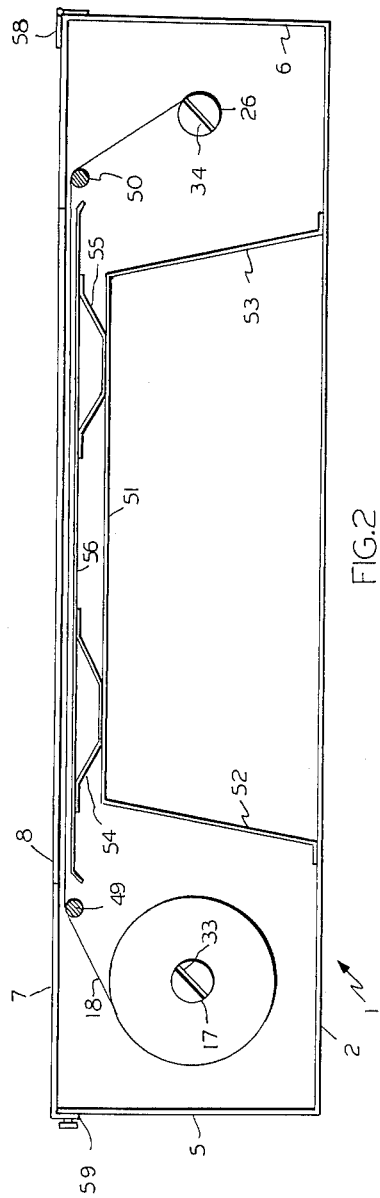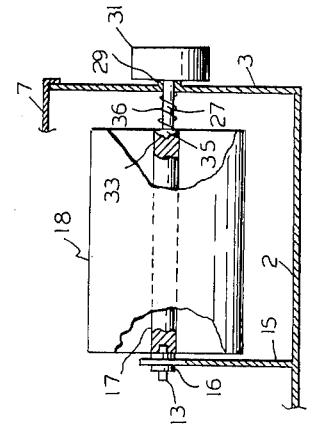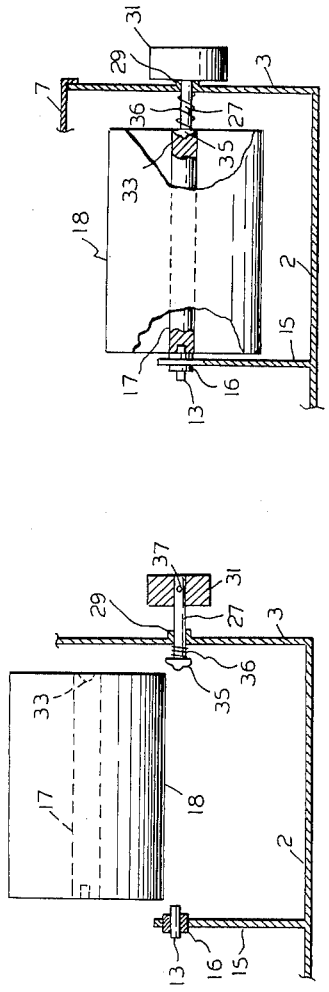

INVENTOR
EARL A. FINCH

BY   R. Hoffman
ATTORNEY

July 5, 1966    E. A. FINCH    3,259,401
DATA TABULATING DEVICE
Filed Jan. 23, 1964    5 Sheets-Sheet 5

```
┌─────────────────────────────────────┐
│ U.S. DEPT. OF AGRICULTURE           │
│ AGRICULTURAL MARKETING SERVICE      │
│ C.E. 12-32B-18 FORM B-11            │
│ 1. CROP AND SURVEY NOS.             │
│ 2. STATE                            │
│ 3. COUNTY                           │
│ 4. SEGMENT NO.                      │
│ 5. SAMPLE NO.                       │
└─────────────────────────────────────┘

┌─────────────────────────────────────┐
│ 28. PLOT LOCATION                   │
│ 29. UNIT 2: NO. OF ROWS             │
│ 30.     NO. OF PACES INTO FIELD     │
└─────────────────────────────────────┘

┌─────────────────────────────────────┐
│ 35. COUNT WITHIN UNIT               │
│ 36.    NO. OF STALKS                │
└─────────────────────────────────────┘

┌─────────────────────────────────────┐
│ 83. INSTRUCTIONS                    │
└─────────────────────────────────────┘

┌─────────────────────────────────────┐
│ 89. TIME DEPARTED FROM FARM         │
└─────────────────────────────────────┘
                9
```

```
┌───────────────────┐
│ 40-R26688         │
│ C.E. 12-32B-18    │
│ CORN YIELD COUNTS │
│ 01   21           │
│ 02   53           │
│ 03   2002         │
│ 04   021          │
│ 05   34           │
└───────────────────┘

┌───────────────────┐
│ 28 XXXXXXX        │
│ 29 169            │
│ 30 98             │
└───────────────────┘

┌───────────────────┐
│ 35 XXXXXXX        │
│ 36 28             │
└───────────────────┘

┌───────────────────┐
│ 83 XXXXXXX        │
└───────────────────┘

INVENTOR
EARL A. FINCH

BY R. Hoffman
ATTORNEY

… # United States Patent Office 3,259,401
Patented July 5, 1966

3,259,401
DATA TABULATING DEVICE
Earl A. Finch, 1311 Hillside Ave., Richmond, Va.
Filed Jan. 23, 1964, Ser. No. 339,835
1 Claim. (Cl. 281—8)

A non-exclusive, irrevocable, royalty-free license in the invention herein described, throughout the world for all purposes of the United States Government, with the power to grant sublicenses for such purposes, is hereby granted to the Government of the United States of America.

This invention relates to a data tabulating device. More particularly it relates to a device for facilitating the direct tabulation of raw data at the point of origin, such as, sample enumerations, polls, censuses, crop surveys, and the like. The device is especially useful when the information gathered is in the form of answers to a repeatedly used questionnaire and which is subsequently to be analyzed or tabulated by data processing equipment.

In conducting a crop survey, for example, it has been the practice up to the present to visit individual farmers and gather certain pertinent data by means of a printed questionnaire. This questionnaire is printed on a sheet which also contains blocks in which the answers are tabulated. Upon completion of the survey in a given area, the census taker then forwards the sheets for processing of the information. As will be apparent, this system requires handling and transporting large quantities of paper. Furthermore, the arrangement and the form of the answers generally are not such that a card-punch operator, for example, can readily transfer the data to cards for machine processing.

Accordingly, one object of the present invention is to eliminate the question and answer sheets, thereby reducing the quantity of paper which must be handled. Another object is to provide a device by means of which a census taker can enter the raw data on a form from which it can readily be transferred to punch cards or other information storing means suitable for use in machine data processing. A further object is to provide a device by means of which it is necessary for the census taker to have only one copy of the questionnaire and whereby the answers can be entered on specially designed forms. Other objects will be apparent to those skilled in the art from the description of the invention which follows.

In general, according to the invention, the data tabulating device comprises a box-like container provided at each end with roll-supporting means. At one end is mounted a feed roll extending partially across the width, and containing a roll of paper tape upon which a questionnaire is printed. At the opposite end of the box is a take-up roll for the questionnaire. On the same axes as the questionnaire rolls, and extending over the remaining width of the box, are feed and take-up rolls carrying a paper tape having answer or data spaces corresponding to the questions. Knobs are provided at the sides of the box for rolling the tapes. The cover of the box is provided with a large window through which only the questionnaire is visible. Next to the window, and parallel are cut a plurality of slots or cells corresponding to the locations of the lines on the answer tape. The data tape can be preprinted with appropriate codes compatible with the items on the questionnaire and entries can be made directly on the tape through the cells adjacent the printed questions.

So that the invention may be better understood, reference is now made to the following detailed description and to the accompanying drawings in which:

FIGURE 2 is a side elevation with the right side removed to further show internal arrangement;

FIGURE 3 is a partial schematic illustration of a roll of data tape about to be inserted into the mounting means;

FIGURE 4 shows the roll of FIGURE 3 in place, with parts cut away to show the means for winding the tape;

FIGURE 5 is a three-dimensional view of the two rolls carrying the questionnaire;

FIGURE 6 is an exploded three-dimensional illustration of the means of securing the questionnaire tape to the rolls;

FIGURE 7 is an enlarged partial section along the axis of a questionnaire roll, looking in the direction of arrows 7—7 on FIGURE 6;

FIGURES 14A and 14B are samples of a typical questionnaire and data tape, respectively.

Figure 1:
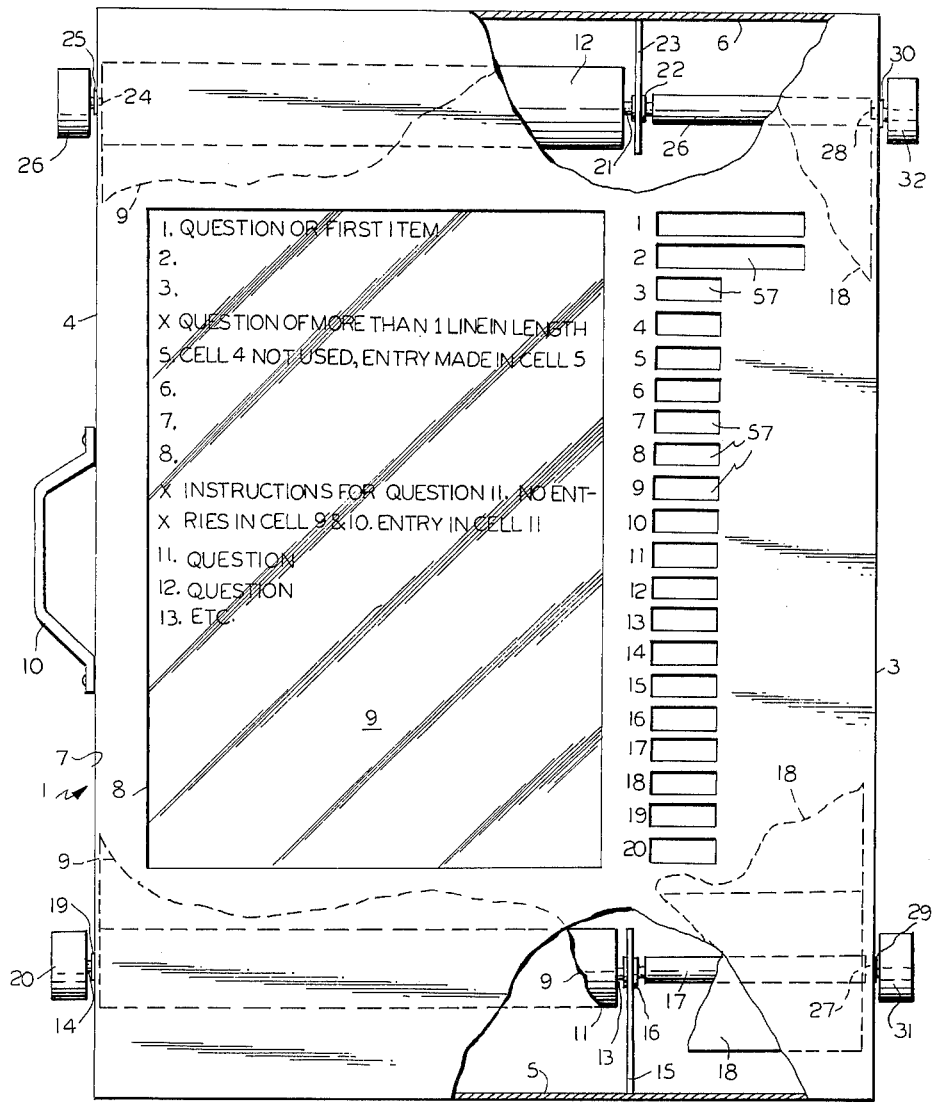
FIGURE 1 is a plan view of the data tabulator showing the face of the device and with parts broken away to show the internal structure.
Figure 8:
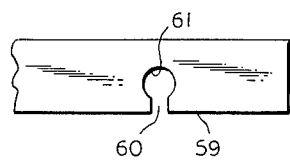
FIGURE 8 is a detail of the end of the cover of the device showing the means of securing the former.

As seen in FIGURES 1 and 2 the device comprises a box-like container, designated generally as 1, having a bottom 2, side walls 3 and 4, front and end walls 5 and 6, respectively, and cover 7. The latter is provided with a rectangular transparent window 8, made of any suitable material, such as plastic or glass, and secured to the cover by any suitable means (not shown). Through the window, in FIGURE 1, there is visible the questionnaire form 9. A handle 10 is secured to one side for carrying the device.

The questionnaire tape 9 is loaded into the device wound on spool 11 and secured to take-up spool 12 in a manner described in greater detail below. Spool 11 is freely rotatably supported on pins 13 and 14 which are mounted in interior partition 15 and side wall 4, respectively. Pin 13 extends through bushing 16 in wall 15 and serve also to support spool 17 on which the data or answer tape 18 is wound. Pin 14 freely rotates in a bushing 19 secured to side wall 4 and is also free to move in an axial direction. A knob 20 is secured to the end of pin 14 and serves to rewind the questionnaire onto spool 11. The structural details of how this is accomplished will be described below in connection with those of the data tape assembly, with which they are identical.

As already described, questionnaire tape 9 is secured to take-up spool 12. The latter is rotatably mounted, in a manner similar to spool 11, on pin 21 secured in bushing 22 through a second inside wall 23. The other end of spool 12 is supported on pin 24 which extends through bushing 25. Pin 24 is provided with a knob 26 for advancing the questionnaire tape. As in the case of spool 11, the means for rotating the spool are not shown, but are identical with those of the data tape spools, as shown in FIGURES 3 and 4.

As already described, a fresh data tape 18, wound on spool 17, is inserted into the device at the same end with the questionnaire tape and the end secured in any suitable manner, as by means of a strip of pressure-sensitive adhesive (not shown), to take-up spool 26. Referring to FIGURE 1, it will be seen that spools 17 and 26 are supported at their left ends on pins 13 and 21, and at their right ends on pins 27 and 28, respectively. The latter are rotated in bushings 29 and 30 by means of knobs 31 and 32.

Referring to FIGURES 2, 3, and 4, it will be seen that spools 17 and 26 are provided with radial slots 33 and 34, respectively. When spool 17 is in place (FIGURE 4), flattened end 35 of pin 27 engages slot 33, thus making it possible to rotate spool 17 by means of knob 31. Pin 27 and spool 17 are kept engaged by means of compression spring 36. To load or remove spool 17, it is only necessary to pull out on knob 31, which is secured to the end of pin 27 by means of screw 37, against spring 36 to provide enough space to remove or insert the spool. When the knob is released, spring 36 will cause pin 27 to engage slot 33. Identical structures are provided for each of the other pins 14, 24, and 28, thus making it possible to either advance or rewind both the questionnaire and data tapes. Pins 13 and 21 are merely cylindrical and engage axial holes in the corresponding ends of the four spools, thus making it possible to rotate the questionnaire spools independently of the data spools.

The means for securing the questionnaire tape are shown in FIGURES 5, 6, and 7. Because the questionnaire will be used repeatedly during a survey, it is desirable that a more permanent securing means be provided than for the data tape which will have to be removed and replaced after each interview. Referring to FIGURES 6 and 7, it is seen that spool 11, for example, is provided with a longitudinal slot 38, parallel to the spool axis and extending its entire length. An end plate 39 is secured to each end of the spool by means of screws 40. A similar slot (not shown) and end plates are provided for spool 12. Tape 9 (FIGURE 5) is placed over slot 38 and is held in place by spring clip 41. The latter is held in place by means of perpendicular end members 42 and 43 which are provided with a depression 44 to engage protrusion 45. A strip of foam rubber or other suitable material 46 is cemented to the underside of slip 41 to provide sufficient friction to secure the questionnaire tape to the roll. The foregoing description applies to identical means (not shown) for securing the tape to take-up spool 12.

Figure 9:
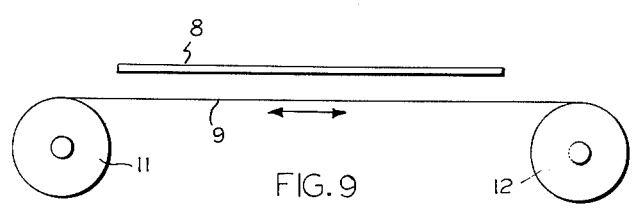
FIGURES 9, 10 and 11 are schematic representations of alternate questionnaire arrangements, to be discussed in detail below.
Figure 10:
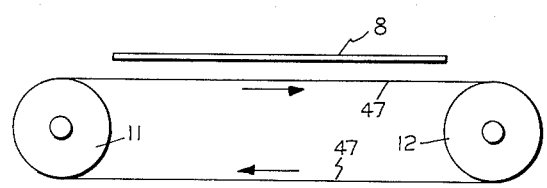
Figure 11:
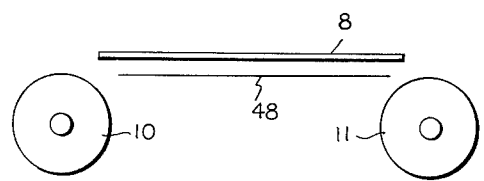

The tape arrangement just described is that shown schematically in FIGURE 9, and is preferred where a long questionnaire is to be used. Where a short questionnaire is intended and will not require a tape longer than twice the distance between spools 11 and 12, the alternate arrangement shown schematically in FIGURE 10 may be used. Thus, instead of using a roll, as in FIGURE 9, an endless tape 47 may be threaded over the spools. Where the questionnaire is short enough to be completely visible in window 8, it can be printed on a card 48 and simply inserted into the device under the window, as shown in FIGURE 11.

Figure 12:
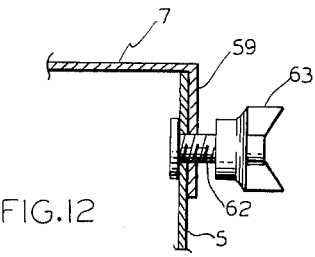
FIGURES 12 and 13 represent the released and secured positions, respectively, of the means for holding the cover of the device in place.
Figure 13:
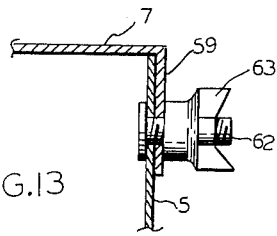

The box itself is of simple construction. Thus, as seen in FIGURES 1 and 2 the box can be made of any flat material which is rigid enough to maintain its shape. For example, the sides, bottom, and top can be made of suitable plastic sheet or aluminum. To provide access to the interior for purposes of loading or removing tapes, cover 7 is secured to rear wall 6 by means of hinge 58, and to keep the cover from opening when in use, it is provided at its forward edge with a perpendicular flap 59. A slot 60, having an enlarged circular opening 61 engages a screw 62 rigidly secured to front wall 5. A wingnut 63, loosened as shown in FIGURE 12, to permit slot 60 to pass over screw 62, when tightened as shown in FIGURE 13, secures the cover.

Referring once more to FIGURE 2, it is seen that the end of the roll of data tape 18 is secured, as previously described, to take-up spool 26. In order to facilitate writing on the tape, the latter is passed over transverse bars 49 and 50 mounted on the sides of the device, thereby being maintained parallel to cover 7. A platform, comprising a flat plate 51 supported by internal wall members 52 and 53, is mounted on bottom plate 2 and secured thereto in any suitable manner. A pair of leaf springs 54 and 55 are secured to plate 51 and these, in turn, support a second flat plate 56. Although, for purposes of clarity, plate 56 is shown separated from tape 18, in actual use, springs 54 and 55 cause plate 56 to press against the tape, thus providing a firm writing surface.

In using the device, the operator turns knob 26 until the appropriate items printed on questionnaire tape 9 appear in window 8. He then turns knob 32 to align data tape 18 so that the appropriately numbered lines on the latter match the question number on tape 9. This is shown in FIGURES 14A and 14B which are sample questionnaires and data tapes, respectively. As the interview progresses, more questions are exposed in window 8 and corresponding portions of data tape 18 are moved up to match the questions. The answers are recorded either as pre-coded numbers or other data by writing directly on the appropriate portion of tape 18 which is exposed in the several openings or cells 57. When a question occupies more than one line or instructions or explanatory material is given on the questionnaire, the corresponding lines on the data tape are left blank, as indicated by the X's on FIGURE 14B.

The data tape also shows how the original enumerated information appears in an orderly, uncluttered and continuous form readily adaptable to an automatic data processing system. The questionnaire and data tape illustrated presupposes a punch-card system. The data tape would be continuous and preprinted with code numbers corresponding to item numbers on the questionnaire roll.

The survey data is entered by the enumerator to the right of the code number on the data tape through the cell openings. The preprinted code numbers on the data tape would be visible through the cell openings—this would assure that the questionnaire item and the cell opening were comparable.

A completed data tape would actually be a continuous tape of several interviews or enumerations by the enumerator. However, there would be only one questionnaire roll form.

The completed tape, after any desired or required editing, is then turned over to a punch-card operator. Such an operator would thus have at hand a packet of pre-coded data, in a continuous, uncluttered form for what should be a highly efficient punch-card preparation task.

As will be apparent from the foregoing description, use of the device has several distinct advantages over the present methods for gathering statistical information. For example, it enables putting the data at the point of origin in a form from which transition to automatic data processing methods can be accomplished directly and quickly, while at the same time greatly reducing the volume of printed material which must be handled by current methods. Except for a small number of master questionnaires, no printed questionnaires would be needed. Furthermore, not only would the time lapse be shortened between the receipt of raw data and its transition to an automatic data processing system, but the device would also facilitate the increased use of statistical techniques, such as size-group analysis, heretofore limited in part by the complexities of a tabulated system or the time required for transition of the information to an automatic data processing system.

Having described my invention, what I now claim is:
A data tabulating device comprising:
(a) a box-like container having rectilinear front and side walls and a rectilinear bottom;
(b) a first pair of spools rotatably mounted inside the container at opposite ends thereof with their axes parallel and partially extending across the container;
(c) a questionnaire-containing tape wound over said first pair of spools;
(d) a second pair of spools rotatably mounted inside the container at opposite ends thereof on axes which are the extensions of the axes of said first pair of spools, whereby there is provided a pair of spools in end-to-end relationship at one end of the container extending across substantially the width of the container and a parallel pair of spools in end-to-end relationship at the opposite end of the container extending across substantially the width of the container;

(e) a data-receiving tape wound over said second pair of spools and extending parallel to the questionnaire-containing tape;

(f) a rectilinear cover on the container having one large rectangular opening exposing a plurality of questions on the questionnaire-containing tape and a plurality of successive small rectangular openings linearly disposed in the direction of the data-receiving tape to expose successive portions thereof, the number of said small rectangular openings being selected to be coextensive with the portion of the questionnaire-containing tape exposed by the large rectangular opening, each of said small rectangular openings being disposed adjacent to a single question on the questionnaire-containing tape;

(g) spool-engaging means rotatably mounted on the sides of the container and extending therethrough for rotating the spools therein; and (h) means for applying pressure over an extensive area of the underside of the tapes mounted in the container, thereby providing a bearing surface for said tapes.

References Cited by the Examiner
UNITED STATES PATENTS

| | | | |
|---|---|---|---|
| 1,180,966 | 4/1916 | Barthold | 281—8 |
| 1,230,997 | 6/1917 | Clise | 281—7 |
| 1,548,510 | 8/1925 | Clay | 281—7 |
| 2,068,272 | 1/1937 | Kaskell | 281—8 |
| 2,915,833 | 12/1959 | Genest | 35—22 |
| 3,153,862 | 10/1964 | Sawyer | 35—9 |

LAWRENCE CHARLES, *Primary Examiner.*